(12) United States Patent
Napoletani et al.

(10) Patent No.: US 7,724,933 B2
(45) Date of Patent: *May 25, 2010

(54) FUNCTIONAL DISSIPATION CLASSIFICATION OF RETINAL IMAGES

(75) Inventors: Domenico Napoletani, Fairfax, VA (US); Timothy D. Sauer, Fairfax, VA (US); Daniele C. Struppa, Irvine, CA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 94 days.

This patent is subject to a terminal disclaimer.

(21) Appl. No.: 12/058,551

(22) Filed: Mar. 28, 2008

(65) Prior Publication Data

US 2008/0240581 A1 Oct. 2, 2008

Related U.S. Application Data

(60) Provisional application No. 60/908,611, filed on Mar. 28, 2007, provisional application No. 60/911,989, filed on Apr. 16, 2007.

(51) Int. Cl.
*G06K 9/00* (2006.01)
*G06K 9/66* (2006.01)
*G06K 9/62* (2006.01)

(52) U.S. Cl. .......... 382/128; 382/190; 382/224
(58) Field of Classification Search ......... 382/128–134, 382/190–194, 224–229, 165, 170, 181; 128/922
See application file for complete search history.

(56) References Cited

U.S. PATENT DOCUMENTS 6,136,541 A * 10/2000 Gulati ............... 435/6
2006/0053005 A1 * 3/2006 Gulati ............... 704/226

* cited by examiner

*Primary Examiner*—Samir A. Ahmed
*Assistant Examiner*—Mehdi Rashidian
(74) *Attorney, Agent, or Firm*—David G. Grossman; David Yee; Edgar G. Rodriguez

(57) ABSTRACT

Retinal images can be classified by selecting a classifier and a figure of merit for quantifying classification quality; selecting a transform to generate features from input data; using a recursive process of functional dissipation to generate dissipative features from the features generated according to the transform; computing the figure of merit for all of the dissipative features generated; searching for at least one of the dissipative features that maximize the figure of merit on a training set; and classifying a test set with the classifier by using the "at least one of the dissipative features."

20 Claims, 9 Drawing Sheets

FUNCTIONAL DISSIPATION CLASSIFICATION OF RETINAL IMAGES

CROSS REFERENCE TO RELATED APPLICATIONS

The present application claims the benefit of provisional patent application Ser. No. 60/908,611 to Napoletani et al., filed on Mar. 28, 2007, entitled "Functional Dissipation Classification for Retinal Images" and provisional patent application Ser. No. 60/911,989 to Napoletani et al., filed on Apr. 16, 2007, entitled "Functional Dissipation Classification for Retinal Images," both which are hereby incorporated by reference.

DETAILED DESCRIPTION OF THE INVENTION

Figure 1:
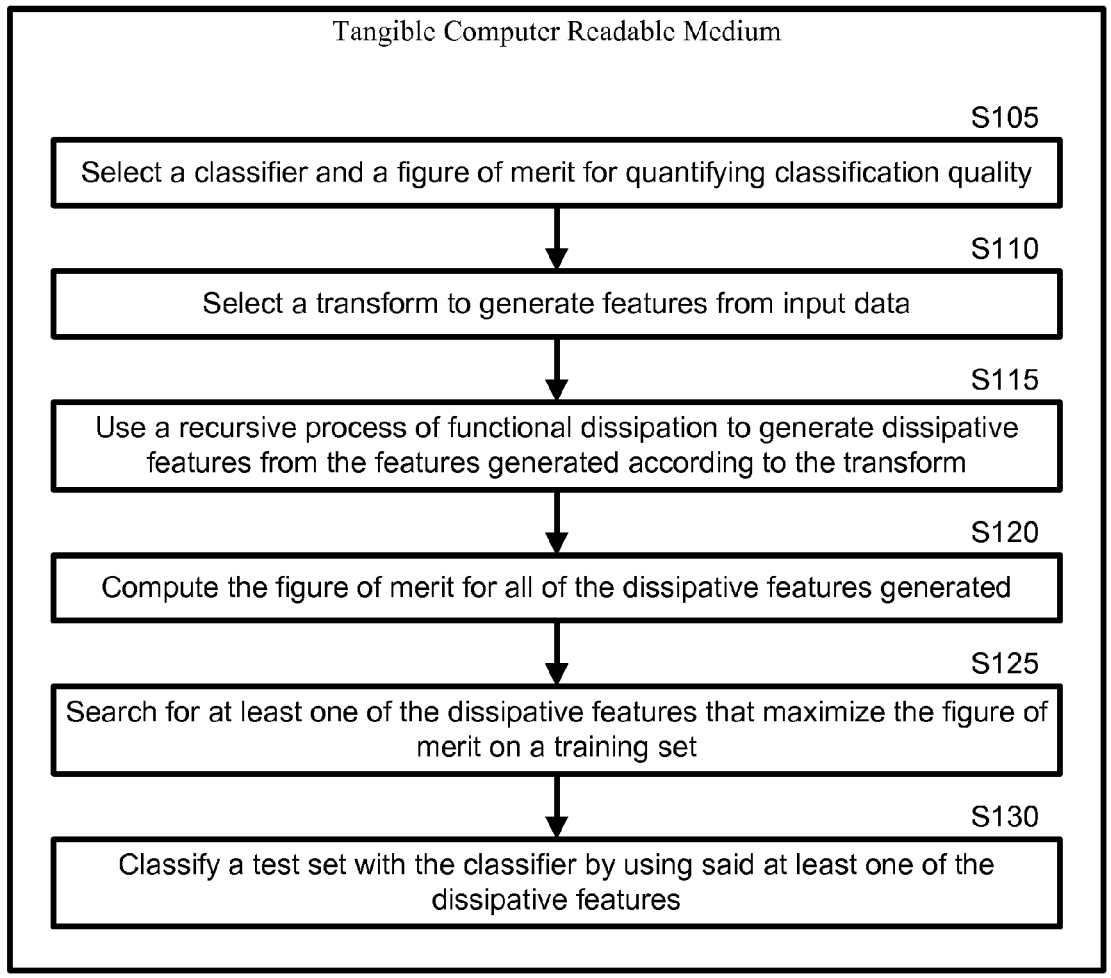
FIG. 1 shows an example of a flow diagram of classifying retinal images using functional dissipation.

The invention embodies a technique for extracting information for enhancing classification of high-resolution, texture rich data. One embodied case study that this present invention involves is retinal imaging.

Overall, images may be taken. These images may then be compared against similar images from a database. The former images may be classified.

The present invention embodies a new improved version of functional dissipation that proves to be very effective for enhancing classification of high resolution, texture-rich data. To some extent, it bypasses one of the main difficulties in classification problem, which is the appropriate, often very specialized, identification of the important features of data. In particular, it bypasses the need to have very specialized feature extraction techniques and can potentially be used as an intermediate, feature enhancement step in any classification scheme.

The present invention uses general purpose signal transforms recursively to explore the space of possible features until it finds a small subset of features that reduces error rates. In other words, it looks to uncover new features. Moreover, it tends to be quite modular, in the sense that new classes can be, in principle, added to the problem without a complete retaining of the embodied algorithm.

Embodiments of the present invention allow for the generation of a variety of masking functions. They further allow features to be extracted with several generalized matching pursuit iterations. In each iteration, the recursive process may modify several coefficients of the transformed signal with the largest absolute values according to a specific masking function. In this way, the greedy pursuit is turned into a slow, controlled, dissipation of the structure of the signal, that for some masking functions, may enhance separation among classes.

Using retinal images as an exemplified model, retinal images from patients may be taken and then compared against healthy retinas from a database. The patients' retinas may be visually classified according to their health status, such as the existence of macular degeneration.

It should be noted the present invention is not limited to the field or retinal imaging. Rather, it is useful in classification, diagnosis and detection in a variety of fields, such as data from biomedical applications, including, but not limited to, histological data, cytological data, dermatological data. Other areas include images of retinas affected not only by macular degeneration, but also other diseases, she as diabetic retinopathy; computed tomography (CT) and magnetic resonance imaging (MRI) images; time series of biological data, such as electroencephalogram (EEG); etc. Furthermore, non-biological applications may also be used, such as, speaker recognition; data from remote sensing, such as false color images of landscape usage; high frequency financial time series, such as currency exchange data; etc.

Referring to FIGS. 1-5, the present invention may be embodied in the form of a physical or tangible computer readable medium (e.g., computer program product, etc.), system or device. In addition, methods of implementing the present invention are also embodied.

The tangible computer readable medium may be encoded with instructions for function dissipative classification of retinal images that are executable by an instruction execution system.

Examples of the tangible computer readable medium include, but are not limited to, a compact disc (cd), digital versatile disc (dvd), usb flash drive, floppy disk, random access memory (RAM), read-only memory (ROM), erasable programmable read-only memory (EPROM), optical fiber, electronic notepad or notebook, etc. It should be noted that the tangible computer readable medium may even be paper or other suitable medium in which the instructions can be electronically captured, such as optical scanning. Where optical scanning occurs, the instructions may be compiled, interpreted, or otherwise processed in a suitable manner, if necessary, and then stored in computer memory.

The instructions may be written using any computer language or format. Nonlimiting examples of computer languages include Ada, Ajax, Basic, C, C++, Cobol, Fortran, Java, Python, XML, etc.

The instruction execution system may be any apparatus (such as computer or processor) or "other device" that is configured or configurable to execute embedded instructions. Examples of "other device" include, but are not limited to, PDA, cd player/drive, dvd player/drive, cell phone, etc.

The physical or tangible computer readable medium 105 may be encoded with instructions for retinal image classification. As illustrated in FIG. 1, upon execution of the instructions, one or more processors may select a classifier and a figure of merit for quantifying classification quality S105; select a transform to generate features from input data S110; use a recursive process of functional dissipation to generate dissipative features from the features generated according to the transform S115; compute the figure of merit for all of the dissipative features generated S120; search for at least one of the dissipative features that maximize the figure of merit on a training set S125; and classify a test set with the classifier by using the "at least one of said dissipative features" S130.

It should be noted that in selecting a transform for generating features from input data, the present invention can use various kinds of transforms. Nonlimiting examples of transforms include wavelet transforms, window Fourier transforms, cosine transforms, wavelet packets, curvelets, etc. For many of these transforms, different levels of details can be selected. For instance, where wavelet transforms are selected, details mean the selection of elements at finer or coarser scales.

Figure 2:
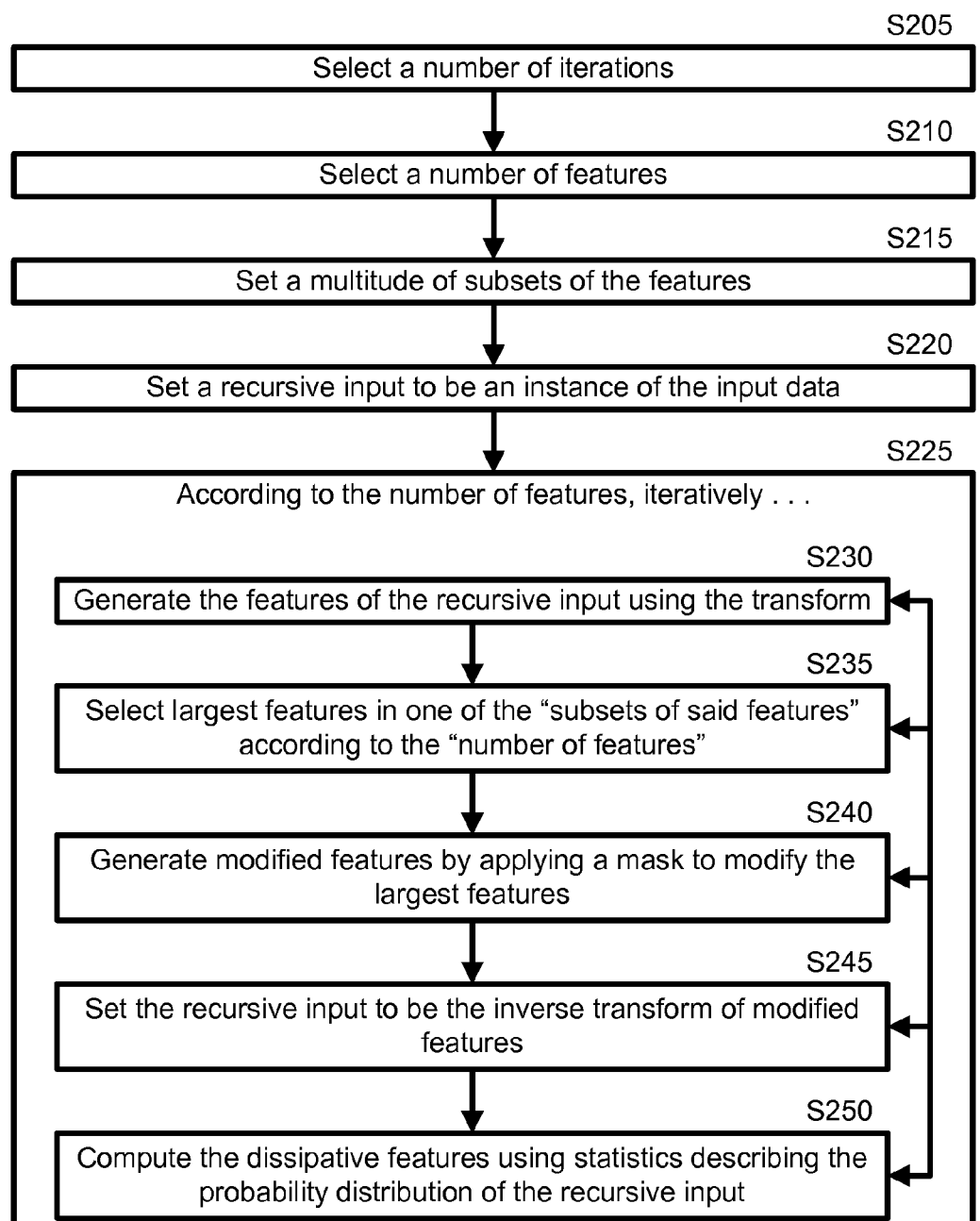
FIG. 2 shows an example of a flow diagram of the use of a recursive process of function dissipation.

The recursive process of function dissipation S115 involves numerous measures. As shown in FIG. 2, functional dissipation S115 includes selecting a number of iterations S205; setting a number of features S210; setting a multitude of subsets of the features S215; setting a recursive input to be an instance of the input data S220; and according to the number of iterations, iteratively S225, generating the features of the recursive input using the transform S230; selecting largest features in one of the "subsets of said features" according to the "number of features" S235; generating modified features by applying a mask to modify the largest features S240; setting the recursive input to be the inverse transform of modified features S245; and computing the dissipative features using statistics describing the probability distribution of the recursive input S250.

All of the embodied instructions for the tangible computer readable medium may be separately and independently embodied as methods (i.e., S105, S110, S115, S120, S125, S130, S205, S210, S215, S220, S225, S230, S235, S240, S245, S250) of detecting malware on a virtual machine. These methods may be incorporated in a malware detection system or apparatus.

Figure 3:
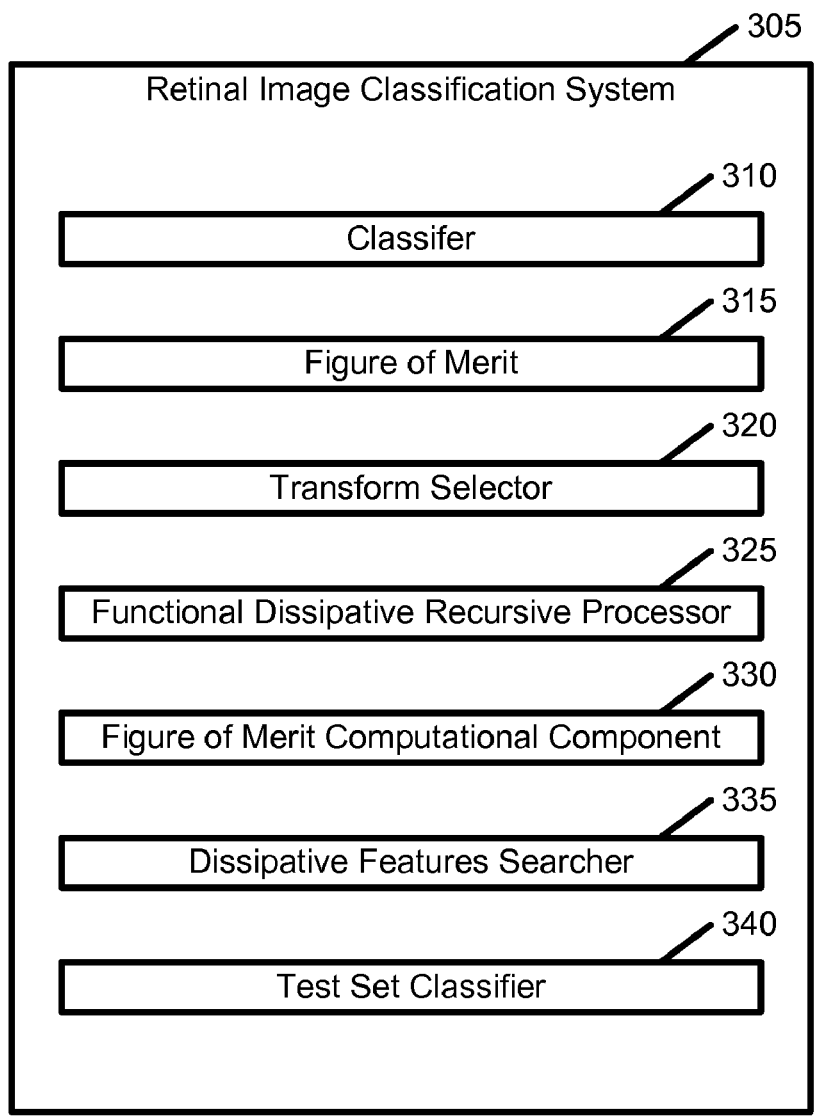
FIG. 3 shows an example of a block diagram of a retinal image classification system.
Figure 4:
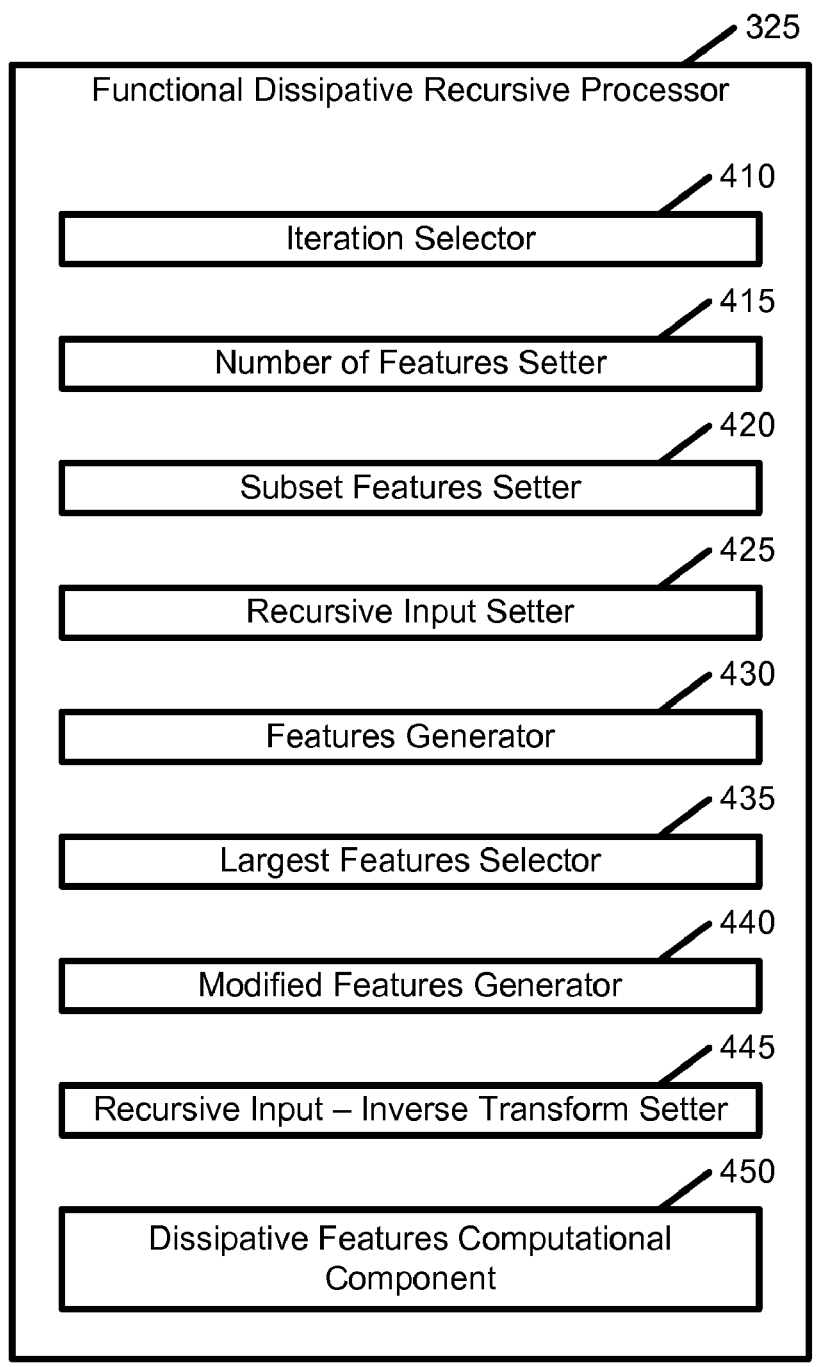
FIG. 4 shows an example of a block diagram of components that can be found in the functional dissipative recursive processor.

As a system, as seen in FIGS. 3 and 4, that can implement the above instructions, components of the retinal image classification system 305 include a classifier 310, a figure of merit 315, a transform selector 320, a functional dissipative recursive processor 325, a figure of merit computational component 330, a dissipative features searcher 335 and a test set classifier 340. Each of these components may interact with one another.

Within the functional dissipative recursive processor 325, a multitude of components may exist, as illustrated in FIG. 4. These may include an iteration selector 410, a number of features setter 415, a subset features setter 420, a recursive input setter 425, a features generator 430, a largest features selector 435, a modified features generator 440, a recursive input—inverse transform setter 445, and a dissipative features computational component 450. Each of these components may also interact with one another, as well as with the ones above.

Figure 5:
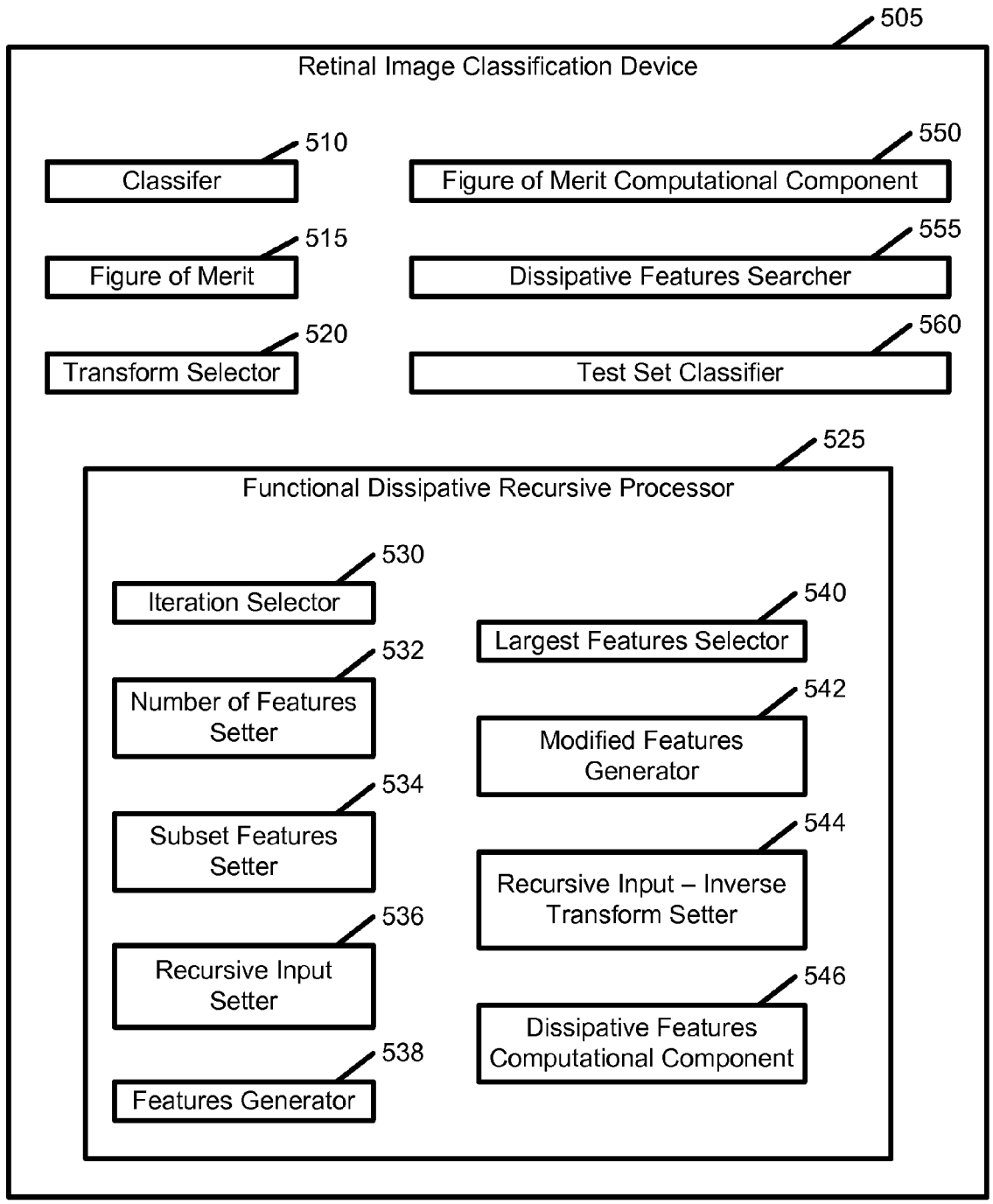
FIG. 5 shows an example of a block diagram of a retinal image classification device.

Similarly, these instructions may be incorporated into a retinal image classification device 505, as shown in FIG. 5. Components include a classifier 510, a figure of merit 515, a transform selector 520, a functional dissipative recursive processor 525, a figure of merit computational component 550, a dissipative features searcher 555 and a test set classifier 560. As above, each of these components may interact with one another.

In addition, components of the functional dissipative recursive processor 525 may include an iteration selector 530, a number of features setter 532, a subset features setter 534, a recursive input setter 536, a features generator 538, a largest features selector 540, a modified features generator 542, a recursive input—inverse transform setter 544, and a dissipative features computational component 546. Each of these components may also interact with one another, as well as with the ones above.

The classifier 310, 510 may be configured for robustly classifying a multitude of input dissipative features. An example of a classifier is a nearest-neighbors classifier.

The figure of merit 315, 515 may be configured for quantifying classification quality.

The transform selector 320, 520 may be configured for selecting a transform to generate features from input data. As one aspect, the transform may be set to be a discrete wavelet transform. The input data may be high resolution, texture-rich data that is capable of being divided into the training set and the test set.

The functional dissipative recursive processor 325, 525 may be configured for using a recursive process of functional dissipation to generate dissipative features from the features that are generated according to the transform.

As part of the functional dissipative recursive processor 325, 525, the iteration selector 410, 530 may be configured for selecting a number of iterations. The number of features setter 415, 532 may be configured for setting a number of features. The subset features setter 420, 534 may be configured for setting a multitude of subsets of the features. The subset of the features may be distinct levels of a discrete wavelet transform. The recursive input setter 425, 536 may be configured for setting a recursive input to be an instance of the input data. The features generator 430, 538 may be configured for generating the features of the said recursive input using the transform. The largest features selector 435, 540 may be configured for selecting the largest features in one of the "subsets of the features" that are computed by the transform according to the "number of features." The modified features generator 440, 542 may be configured for generating modified features by applying a mask to modify the largest features. For one or more masks, functional dissipation may be repeated at least once. In one aspect, the mask is randomly selected. In another aspect, the mask is a realization of a low variance Gaussian white noise convolved with low-pass filters. The recursive input—inverse transform setter 445, 544 may be configured for setting the recursive input to be the inverse transform of modified features. The dissipative features computational component 450, 546 may be configured for computing the dissipative features using statistics describing the probability distribution of the recursive input. As an example, the statistics is at least one statistical moment.

The figure of merit computational component 330 may be configured for computing the figure of merit for all of the dissipative features generated.

The dissipative features searcher 335 may be configured for searching for at least one of the dissipative features that maximize the figure of merit on a training set.

The test set classifier 340 may be configured for classifying a test set with the classifier by using the "at least one of said dissipative features."

I. Introduction

The present invention introduces a variant of functional dissipation microarray, a feature enhancement algorithm that is inspired by experimental microarray techniques [1]. Using the embodiments of the present invention, biological methodologies can be successfully turned into functional data analysis tools.

The idea behind the use of microarrays is that if a large and diverse enough data set can be collected on a phenomenon, it is often possible to answer many questions, even when no specific interpretation for the data is known. Here, the algorithm seems particularly suitable for high resolution, texture-rich data and bypasses to some extent the need to preprocess with specialized feature extraction algorithms. Moreover, it can potentially be used as an intermediate feature enhancement step in any classification scheme.

The present invention's algorithm is based on an unconventional use of matching pursuit ([2], Chapter 9; [3]). More precisely, random masking functions may be generated, and features with several generalized matching pursuit iterations may be selected. In this way, the matching pursuit becomes a slow, controlled dissipation of the structure of the signal. This process is referred to as "functional dissipation." Function dissipation is based on signal transforms. The idea is that some unknown statistical feature of the original signal may be detected in the dissipation process at least for some of the maskings.

Strikingly, under this process, individually, each feature extraction with masking may become unintelligible because of the added randomness and dissipation, and only a string of such feature extractions can be "blindly" used to some effect. There is some similarity in spirit between this approach and the results on random projection reconstructions as described in [4] and [5]. One important difference between this approach and known techniques is that the present invention uses several distinct randomnization and dissipation processes as an advantage so that there is a strong non-linear dynamics emphasis. Another important difference is that the present invention can bypass altogether reconstruction issues, focusing directly on classification in the original representation space. Moreover, the present invention can also be seen as a new instance of ensemble classifiers (like boosting [6] and bagging [7]), in that several functional dissipations are generally pulled together to achieve improvement of classification results.

Other applications of matching pursuit to classification problems include kernel matching pursuit methods [8], and also boosting methods. These methods can be interpreted essentially as greedy matching pursuit methods where the choice of "best" coefficient at each iteration made with respect to more sophisticated loss functions than in the standard case, as in [9], [10] and Chapter 10 of [11]. While the present invention uses the structure of matching pursuits, it is mainly their rich dynamical properties (as highlighted, for example, in [3]) that are used for the generation of features because, here, the whole iterative process of modifying coefficients generally becomes an instance of non-linear iterative maps, disjoined from approximation purposes.

The present invention may be applied to multiple biological and nonbiological scenarios. For instance, a case study may involve the classification of images of retinas with various stages of dry macular degeneration. Dry macular degeneration can be seen from an image analysis view point as an alteration of the texture of the fovea, with drusen (white spots and deposits) clustered in various ways on the retina. More advanced stages tend to show a complete destruction of the retina in some areas. Such major alterations cannot be considered simply as texture alterations. Thus, this problem offers some new challenges for the functional dissipation technique developed in [17]. With respect to the exemplified case study, the goal of the present invention's classification is to recognize the stage of macular degeneration of a given set of retinal images.

The basic approach here is to derive long feature vectors for each retinal image by the generalized recursive greedy matching pursuit. Since from the exemplified case study the retinal images show a great local variability among different patients, any significant feature must encode statistical information about the image to be part of a robust classifier. As a reference, one may see [10]. The case study here can be seen to some extent as an instance of texture classification. And, it is well established that wavelets (see [2] chapter 5, [13]) and moments of wavelet coefficients (see e.g., [14] or [15] for the specific problem of iris recognition) can be very useful for these types of problems. Therefore, the present invention is implemented in the context of a wavelet image transform for this case study, even though the information obtained with the functional dissipation with moments of the dissipated images in the original representation space are then summarized. Other choices of statistical quantities are possible in principle according to the specific application, since, as described herein, the present invention can be formulated in a general setting.

II. Functional Dissipation for Classification

Here introduces a classification algorithm that is designed for cases where feature identification is complicated or difficult. Possible, specific implementations and results are described further below. A brief outline of the major steps of the algorithm may be as follows:

A: Choose a classifier and a figure of merit that quantifies the classification quality.

B: Choose a basic method of generating features from the input data, and then enhance the features by a recursive process of structure dissipation.

C: Compute the figure of merit from A for all features derived in B. For a fixed integer p, search the feature space defined in B for the p features which maximize the figure of merit in A on the training set.

D: Apply the classifier from A, using the optimal p features from C, to classify the test set.

In step A, many types of classifiers can be used. As one example, multivariate linear discrimination can be used as a classifier. This method comes with a built-in figure of merit, the ratio of the between-group variance to the within-group variance. More sophisticated classifiers (such as support vector machines, k-nearest-neighbor classifiers, and neural networks) often have closely associated evaluation parameters and can be used. Cross-validation or leave-one-out error rates can also be used.

Step B is the heart of the functional dissipation algorithm. The features used generally depend on the problem. For two-dimensional images, orthogonal or over-complete image transforms can be used. The method of functional dissipation is a way to leverage the extraction of general purpose features to generate features with increased classification power. This method may also use the transforms recursively to gradually modify the feature set.

For example, consider a single input datum X and several invertible transforms $T_k$, k=1, ..., K that can be applied to X. (As in the case study shown later, X represents a 256×256 gray scale image and $T_k$ represent Discrete Wavelet Transforms.) At each iteration several coefficients may be selected from the input datum X. The mask may be used to modify the coefficients themselves. Also, B includes fixing positive integers K, M and setting $X_0$ as $X_0=X$. Furthermore, B includes letting $A(x)$ be a discrete valued function defined on ZZ, which may be called or defined as a "mask" or a "masking function." The following functional dissipation steps (B1)-(B3) may be applied K times.

For k=1, . . . , K:
- (B1): Compute the transform $T_k X_{k-1}$
- (B2): Choose a subset S of $T_k X_{k-1}$ and collect the M coefficients C(m), where m=1, . . . , M in S with the largest absolute value in a suitable subset.
- (B3): Apply the mask—Set C'(m)=A(m)C(m), and modify the corresponding coefficients of $T_k X_{k-1}$ in the same fashion. Set $X_k = T_k^{-1} (T_k X_{k-1})'$ to be the inverse of the modified coefficients $(T_k X_{k-1})'$ At the conclusion of the K steps, features may be generated by computing statistics that describe the probability distribution of $X_k$, where k=0, . . . , K. For example, one could use m(h),h=2, 3, 4, the second, third and fourth moments of the set (or even more moments for large images). These statistics may be used as features, delivered by the means of functional dissipation. If these steps are carried out for N different masks $A_n$, a 3(NK+1)-dimensional feature vector may be obtained for each data input, where the moments of the input images may be counted once only.

One way to view these embodiments is as a matching pursuit strategy (see e.g., [2], chapter 9), but used in a new and unusual way. In general, matching pursuit is used to find good suboptimal approximations to a signal. The way this finding can be accomplished is by expanding a function ƒ in some dictionary D={$g_1$, . . . , $g_p$} and by choosing the element in the dictionary $g_k$ for which |<ƒ,$g_k$>| is maximum. Given an initial approximation ƒ̃=0 of ƒ, and an initial residue Rƒ=ƒ, the following may be set as follows: ƒ̃=ƒ̃+<ƒ,$g_k$>$g_k$ and Rƒ=Rƒ-<ƒ,$g_k$>. The process may be repeated on the residue multiple times to extract successively different relevant structures from the signal.

Unlike the known method, the present invention embodies, in each iteration of the algorithm, modifications of several of the largest coefficients in different regions of the transformed signal according to the random masking functions. Such modifications generate interest in the non-linear interaction of the signal and the masking function, as opposed to the approximation of the underlying signal. The residue may be perturbed more and more until, in a particular limit, no structure of the original signal is visible in either Rƒ and/or ƒ̃. Such process thus allows for a slow, controlled dissipation of the structure of the signal. It should be noted that the structure of the signal is dissipated. It is not the signal's energy that is dissipated. In other words, the images $X_k$ may be allowed, in principle, to increase in norm as k→∞.

The input image X can be seen as an initial condition of the iterative map defined by mask and dissipation. The application of several dissipation processes may allow one to identify those maps for which different classes of images flow in different regions of the feature space, as defined by the output of the map. It seems likely that, on one hand, for some non-linear maps, similar initial conditions can evolve with similar dynamics. On the other hand, small differences among classes are likely to be enhanced by the dynamics of the map. Therefore, such differences should be detectable as the number of iterations increase. The key question is whether a small set of masks can generate enough variability among the dissipative processes to find such interesting dynamics.

In the case study with retinal images, results show that sufficient variability is generated. According to this qualitative dynamical system interpretation, embodiments of the present invention can thus be seen along the lines of dynamical system algorithms for data analysis, such as those developed in [16] to approach numerical linear algebra problems.

In choosing the masking functions for (B1)-(B3), the guiding idea is to have large variability in the masks themselves so that there is a wide range of possible dynamics in the dissipations processes. Meanwhile, the selection process should also allow for the preservation of some of the structure of the signal from one iteration to the next. In essence, the signals should be dissipated, but slowly. To this extent, the masking functions may be designed to assume small values so that the image is only slightly affected at each iteration by the change of a subset of its coefficients as in (B1)-(B3). To respect these limitations, each mask may be taken as a realization of length M of Gaussian white noise with variance 1. The mask can then be convolved with a low-pass filter to increase smoothness. Finally, the convolved mask may be rescaled to have a fixed maximum absolute value.

More precisely, one embodiment lets W[m], where m=1 . . . , M, be a realization of Gaussian white noise with length M. Another embodiment lets g be a smoothing filter defined on all integers ZZ such that $$g[m] = \cos^2\left(\frac{\pi m}{2E}\right) 1_{[-1E,E]}[m],$$

where $1_{[-E,E]}$ denotes the function that assumes value 1 for m<E and value 0 otherwise. It should be noted that the above may follow p. 440 of [2] as a guide.

Figure 6:
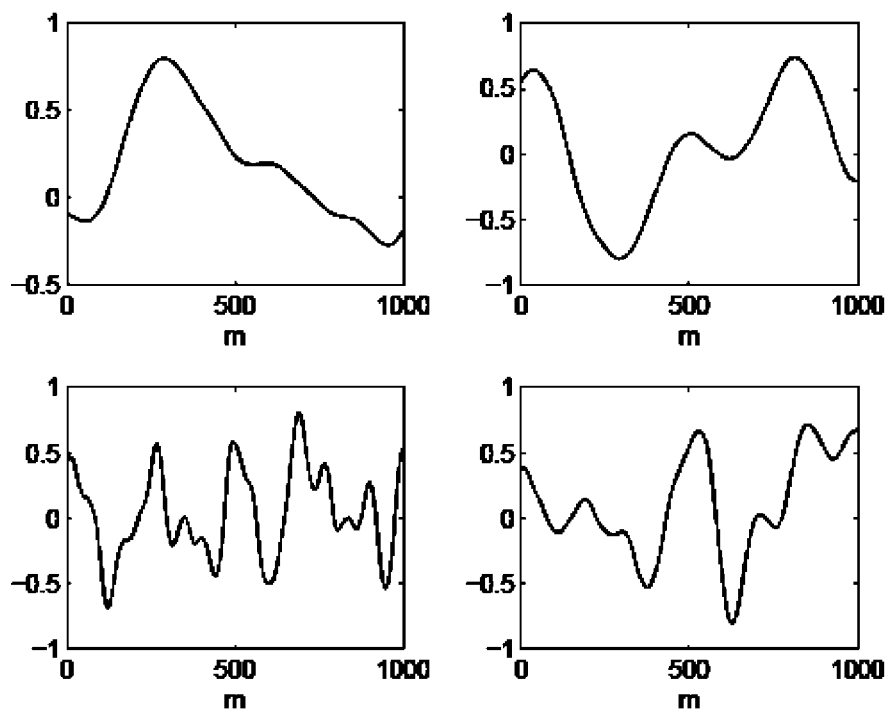
FIG. 6 shows examples of masking functions (defined for coefficient indexes m=1, ..., 1000) used in the iterative process (B1)-(B3).

Now, as the new and useful components, let W̃=W*g be the convolution of W and g, where W is more suitably extended periodically at the boundary. Then, each mask can be written as A=αW̃/max(|W̃|), where α is a small real number. The larger E becomes, the smoother the mask A gets. However, the fact that each underlying W is a random process helps assure the necessary variability. This process may be repeated N times and includes choosing several values of E and α to generate curves of the type as shown in FIG. 6.

For the case study involving retinal images, E may be chosen to be distributed on [M/3,0]. The logarithmic distribution may be chosen on this set so that smoother masks are favored. For instance, M may be 1000 and E may be taken uniformly in the set ϵ={299,139,64}. Furthermore, α may be <1 (such as α=0.8) to cause slow dissipation.

The randomness of the specific choice of masks may be used to allow a wide spanning of possible mask shapes. It is expected that more general classes of maskings are suitable for this method. However, it remains debatable as to which is the smallest class of masks that allows for effective feature extraction.

III. Case Study: Retinal Images and Dry Macular Degeneration

In this section, the relevant background for the case study that is explored here is introduced. The case study involves the classification of retinal images according to the severity of dry macular degeneration (MD) that can be detected in them. MD is a disease mostly localized at the center of the retina (fovea). Because the fovea is the most important for detailed vision, the case study here focuses on images of roughly a quarter of the total size of the retina, all centering on the fovea.

By no means does the present invention limit that application and usefulness of the algorithm to this case study alone.

Rather, one skilled in the art would appreciate that this case study serves merely as an enabling example that shows how the algorithm may be applied in a tangible computer readable medium, system, or apparatus for functional dissipation classification. Other case studies may include other biological images (e.g., various stages of diseases and/or deformation among cells, organs, tissues, etc., like heart disease, lung cancer, bone deformation, seizures, etc.; sustained injuries and/or trauma; etc.).

Here, the case study may be restricted to two possible stages of macular degeneration: low and severe, which may be denoted respectively as S1 and S2. The "low" class may include cases that have low to intermediate texture alteration of the retina. The severe class may include cases where large drusen deposits and global alterations of the retina can be seen. Clearly, depending on how fine the classification is sought, the number of classes can increase or decrease.

Figure 7:
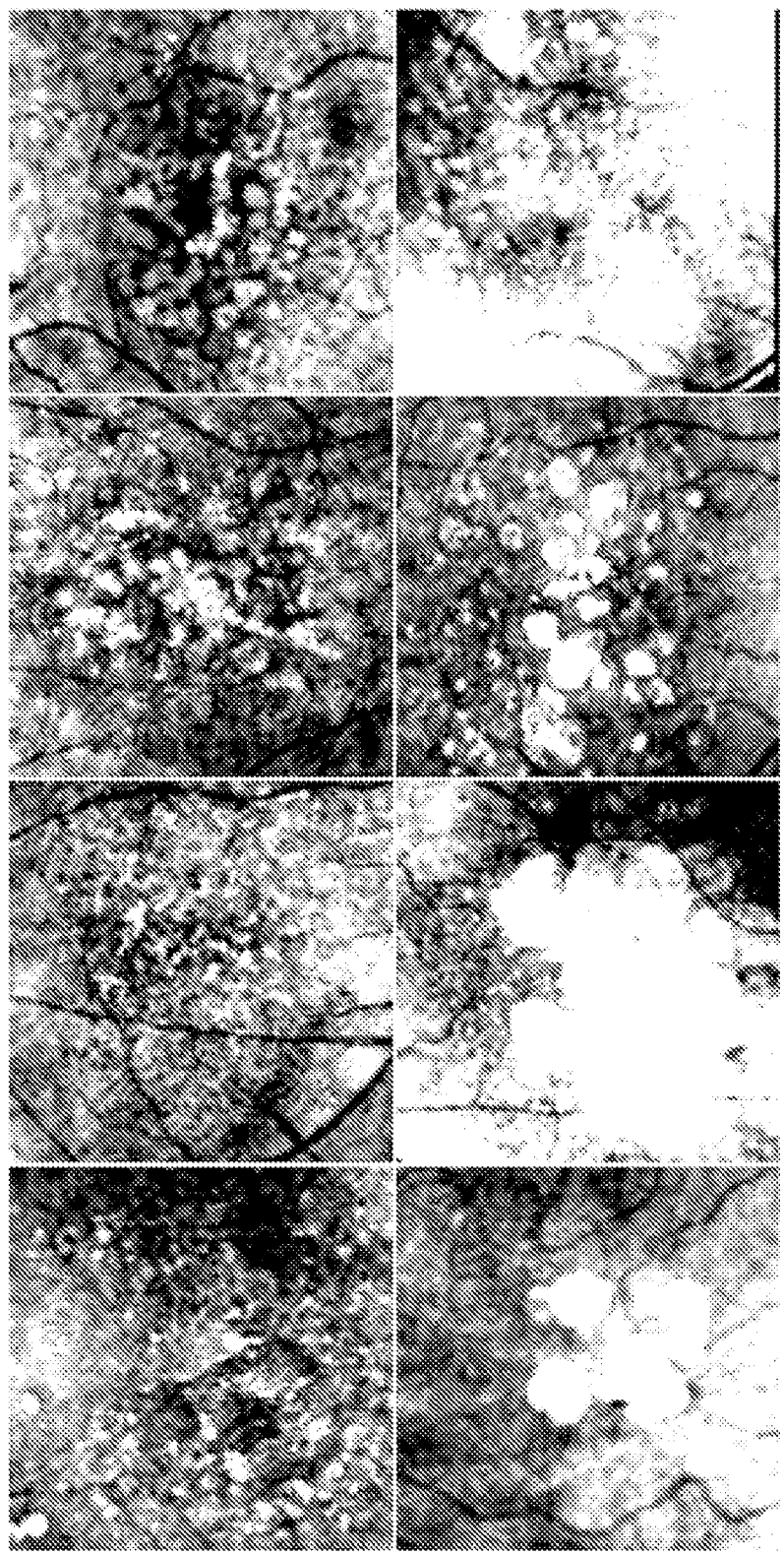
FIG. 7 shows, for each column from left to right, examples of representative retinas (foveas) affected respectively by low macular degeneration S1 and severe macular degeneration S2.

From left to right in FIG. 7, each column respectively shows four representative patterns of classes S1 and S2. The images show a centered focus on the fovea.

Results of experiments on this case study, together with the inventors' previous work on classification of crystallization patterns of solutions of proteins [17], show that the method is robust and flexible enough to deal, with some modifications, with a wide variety of data sets. The methods described herein are useful in classification and detection problems from a variety of fields. In addition to the examples previously mentioned, other nonlimiting examples include: data from biomedical applications (such as images of histological, cytological, and dermatological data); images of retinas affected not only by MD, but also by other diseases (such as diabetic retinopathy); and CT and MRI images and time series of biological data (such as EEG). Nonbiological examples include data from remote sensing, (such as images of landscape usage), and high frequency financial time series (such as currency exchange data).

IV. Experimental Results

Here discusses a particular implementation of the pattern classification algorithm and the results of applying it to retinal images. For the analysis, 20 gray-scale images for each of the two classes of retinas were used. The sized of the images were reduced uniformly to matrices of 256×256 pixels. The images were normalized so that their means as arrays are 0 and their variances are 1.

Steps (B1)-(B3) of the algorithm may be applied with several masks and function dissipation (K>1). The best p=2 features may be selected. The masking functions used include the previously described Gaussian processes and their accompanying parameters (i.e., distribution of E on [M/3,0], where M may be 1000 and E may be taken uniformly in the set $\epsilon=\{299,139,64\}$; logarithmic distribution; $\alpha<1$ (such as $\alpha=0.8$)).

Next, to the selected features, the present invention applies a general purpose classification algorithm, such as a 3-nearest neighborhood (3-NN) classifier to the output of (B1)-(B3). Each case may be tested by dividing the 20 instances of feature vectors for each class randomly into a training set of 15 instances and a test set of 5 instances. The classifier may be trained on the training set, and afterwards, be tested on the remaining 5 instances of each of the two classes S1 and S2. Each classification scheme may be repeated (e.g., 5000 times), using different divisions into training and testing sets to obtain estimated misclassification error rates for each class.

The transforms $T_k$ in steps (B1)-(B3) may be set to be the discrete wavelet transform with Daubechies mother wavelet (8 vanishing moments). The restricted subset of action S (as in (B2)) is the detail level at scale $2^{-5}$ (highlighting intermediate scale details of the image) for k odd (see e.g., [2] section 7.7 for more on two dimensional orthogonal wavelet bases).

As an important note, signal transforms need to be selected according to the specifics of the problem. The potential of the embodiments of the present invention is that the features exploration performed by functional dissipation tends to utilize variations of general purpose signal transforms. Such use avoids the need to exactly adapt the transform to the characteristics of the classes of signals.

Moreover, moments of images for large iterations can show, sometimes, a very distinct order of magnitude for different classes. While this aspect is good in general for classification, it is usually not so good for selecting suitable "best" features. The reason is that the differences among some of the classes can be flattened if they are very close with respect to other classes. Therefore, to avoid this problem, the present invention takes the logarithm of the absolute value of moments in the following classification scheme, and they are scaled to have joint variance 1 and mean 0.

As an embodiment, the present invention may take N=100 random masks $A_n$, where n=1, ..., N and defined on ZZ. The function dissipation technique may be turned on by setting K=20 in steps (B1)-(B3). At each iteration, M=1000 coefficients may be selected. If steps (B1)-(B3) are repeated for each masking $A_n$, one may obtain a 3(NK+1)=6003—dimensional feature vector for each image. Next, the "best" p=2 features may be selected for which the ratio of between-class variance over within-class variance for the training sets may be maximal (see page 94 of [11] for more on such notion). If only these 2 moments are used in the 3-NN classification of the test sets, then the estimated misclassification errors for the two classes may be: 0.06 for S1 and 0.04 for S2.

Figure 8:
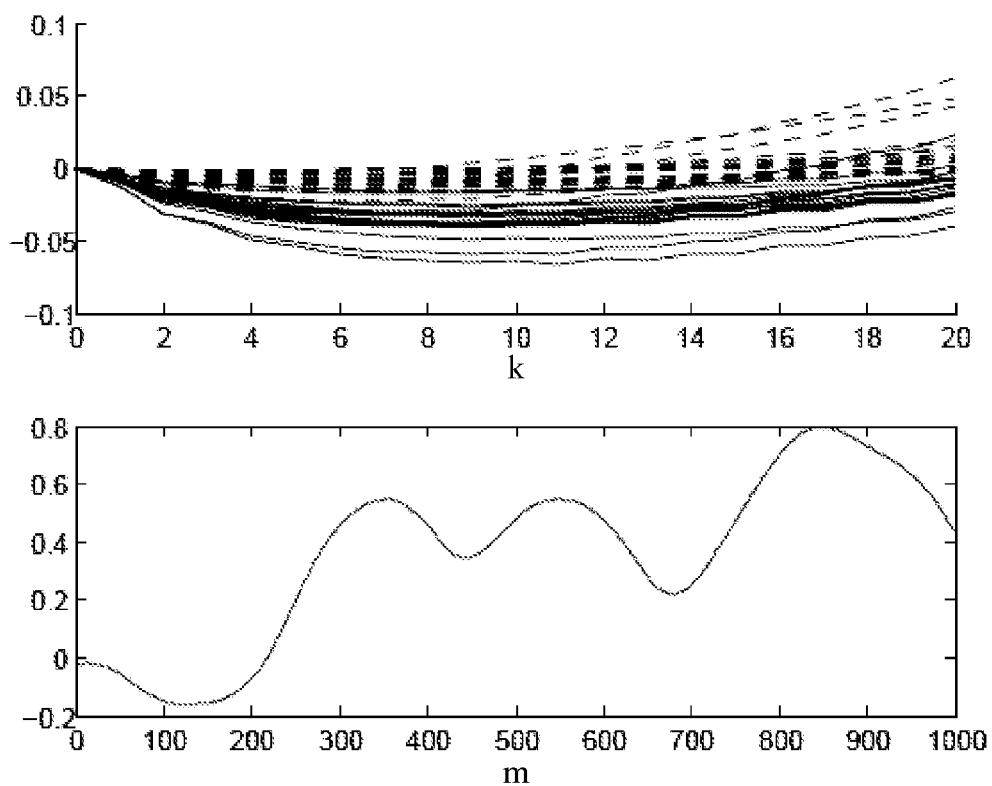
FIG. 8 shows two embodied subplots, where the top subplot shows the logarithms of the norm of the second moment for the 20 instances of S1 and the 20 instances of S2, and where the bottom subplot shows the corresponding mask defined for indexes m=1, ..., 1000. The top subplots are plotted at each of k=1, ..., 20 iterations of (B1)-(B3) for a specific mask that shows improved separation among these two classes. At k=0, the logarithms of the norm of the skewness of the input images are plotted.

Referring to FIG. 8, examples of the second moment (also referred to as variance) for the 20 instances of S1 (solid lines) and the 20 instances of S2 (dotted lines) are shown. Moving along the dissipation process for one specific mask, improved separation among these two classes can be seen. At k=0, the moments of the images may be pictured when no mask and no dissipation is applied. Because of normalization, these moments should be identically zero. The two classes tend to be considerably overlapping for k=1 ..., 6, where an average of about 4 instances of S1 seem deep in the cluster of S2. Then, a divergence of the cluster of moments may be seen. For k=9, only one instance of S1 may be close to the cluster of moments of S2. Eventually, the dynamics for the two clusters converge again.

Figure 9:
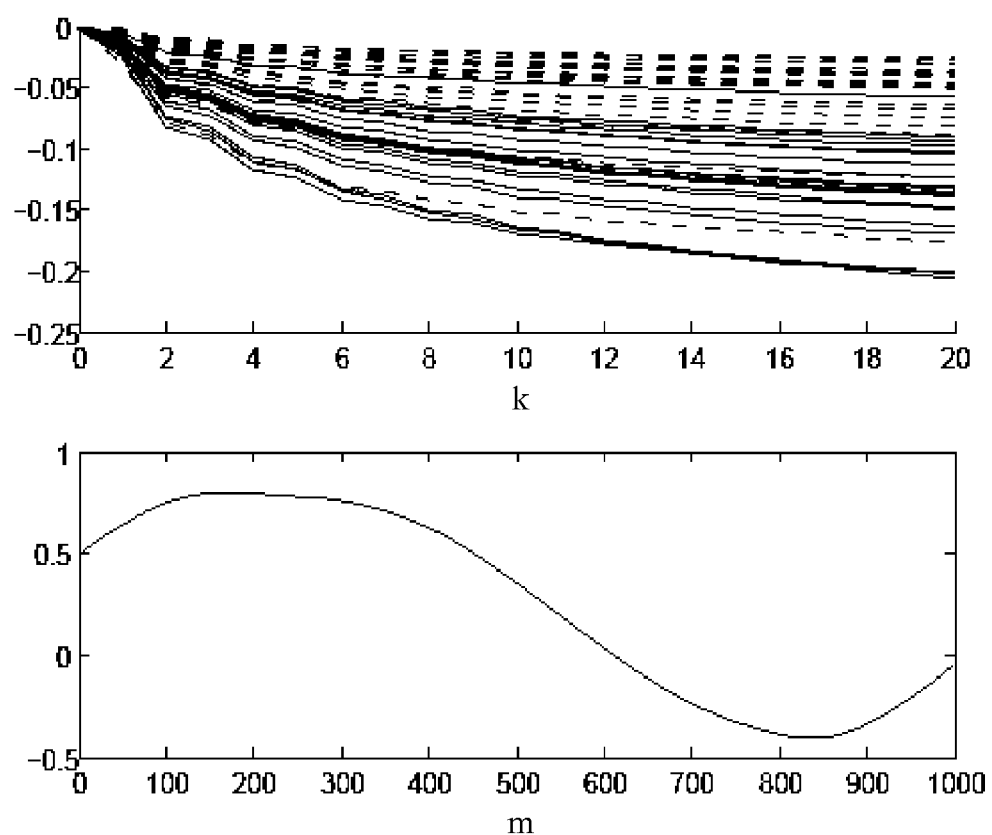
FIG. 9 shows two more embodied subplots, where the top subplot shows the logarithms of the norm of the second moment for the 20 instances of S1 and the 20 instances of S2, and where the bottom subplot shows the corresponding mask defined for indexes m=1, ..., 1000. The top subplots are plotted at each of k=1, ..., 20 iterations of (B1)-(B3) for a specific mask that does not show improved separation among these two classes. At k=0, the logarithms of the norm of the skewness of the input images are plotted.

The bottom subplot shows the shape of the corresponding mask. This distinct improvement in separation generally happens, with similar dynamics, for 3 out of about the 100 masks that were generated. The remaining masks may not show any improvement in separation, as indicated in FIG. 9. Interestingly, all the masks that show improved separation between S1 and S2 assume small values for the first few hundred largest coefficients. Large values may be seen for the middle coefficients. This generic shape may be difficult to predict, but it is simple enough that it raises the hope that spanning a small space of masks will be enough in general classification problems, greatly reducing the training computational cost. However, it is likely the scenario where thousands of masks may be necessary for very difficult classification problems.

With respect to different pairs of classes, the masks that improve separation may have very different shapes. Such observations may be used to suggest ways to lower even more classification error rates for multiple class problems. For example, consider extracting one best feature for each pair of classes, and let $m_{ab}$ be such feature. This example may create a total of n(n−1)/2 such features for a n-classes problem.

Within the setting of the previous classification scheme, the present invention may apply to each testing image a 3-NN classification for feature $m_{ab}$ using only classes a and b, and may repeat the classification for each of the n(n−1)/2 features. Finally, the majority vote among all n(n−1)/2 classifications may be used to assign a class to each testing image. This strategy may be seen in [17] to greatly reduce error rates for multiple class problems. It is also expected to play the same significant role in the context of retinal images.

The use of many masks aids in looking at data from multiple different (albeit unstructured) view points. In line with the microarray approach, each of the elements of the feature vector may be called a "dissipative gene." When the resulting dissipative genes are displayed in several columns, where each column represents the dissipative genes for one instance of a protein or Water, the result may be called a "functional dissipation microarray." It is interesting to note that, supposedly, one of the weaknesses of matching pursuit is its inability, as a greedy algorithm, to find an optimal representation for a given signal. The use of randomization and dissipation turns this weakness into a strength, at least in the setting of classification problems. This change of perspective is in line with the idea that greedy matching pursuit methods have a greater potential than simply being approximations to optimal solutions. The dynamical interaction of masks and dissipative iterations makes the signals "flow" in the feature space. It is this flow that often carries the most significant information on the initial conditions, and therefore, on the signals themselves.

V. References

The following references are referred to as an aid to explain and enable the present embodiments. In several instances, the references have been referenced by their preceding number references.

[1] P. Baldi, G. W. Hatfield, W. G. Hatfield, *DNA Microarys and Gene Expression: From Experiments to Data Analysis and Modeling*. Cambridge University Press (2002).

[2] S. Mallat, *A Wavelet Tour of Signal Processing*, Academic Press (1998).

[3] G. Davis, S. Mallat and M. Avelaneda, Adaptive Greedy Approximations, Jour. Of Constructive Approximation, 13 1997 (1), pp. 57-98.

[4] E. J. Candes and J. Romberg, Practical Signal Recovery from Random Projections, Wavelet Applications in Signal and Image Processing XI, Proc. SPIE Conf. vol. 5914 (2005), 59140S.

[5] E. J. Candes, J. Romberg and T. Tao, Robust uncertainty principles: exact signal reconstruction from highly incomplete frequency information. IEEE Trans. Inform. Theory, 52 489-509.

[6] Y. Freund, R. Schapire, A short introduction to boosting, *J. Japan. Soc. For Artificial Intelligence*, vol. 14 n. 5 (1999), pp. 771-780.

[7] L. Breiman, Bagging predictors. Machine Learning, 24 (1996), pp. 123-140.

[8] P. Vincent, Y. Bengio, Kernel matching pursuit, Mach. Learn. J. 48 (2002)(1), pp. 165-187.

[9] J. Friedman, T. Hastie, R. Tibshirani, Additive Logistic Regression: a Statistical View of Boosting, Annals of Statistics, 28 (2000), pp. 337-374.

[10] J. Friedman, Greedy function approximation: A gradient boosting machine. Ann. Statist. 29 (2001)(5), pp. 1189-1232.

[11] T. Hastie, R. Tibshirani, J. Friedman, *The elements of Statistical Learning*, Springer (2001).

[12] K. Fukunaga. Introduction to Statistical Pattern Recognition (2nd Edition ed.), Academic Press, New York (1990).

[13] A. Laine and J. Fan, Texture classification by wavelet packet signatures. IEEE Trans. Pattern Anal. Mach. Intell. 15 11 (1993), pp. 1196-1191.

[14] Q. Jin and R. Dai, Wavelet invariants based on moment representation, Pattern Recognition Artif. Intell. 8 (1995) (3), pp. 179-187.

[15] S. Noh, K. Bae, Y. Park, J. Kim, A Novel Method to Extract Features for Iris Recognition System. AVBPA 2003, LNCS 2688 (2003), pp. 862-868.

[16] R. W. Brockett, Dynamical systems that sort lists, diagonalise matrices, and solve linear programming problems. Lin. Algebra Appl. 146 (1991), pp. 79-91.

[17] D. Napoletani, D. C. Struppa, T. Sauer, V. Morozov, N. Vsevolodov, C. Bailey, Functional dissipation microarrays for classification, 2006, submitted.

Many of the elements described in the disclosed embodiments may be implemented as modules. A module is defined here as an isolatable element that performs a defined function and has a defined interface to other elements. The modules described in this disclosure may be implemented in hardware, software, firmware, wetware (i.e., hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL), such as VHSIC hardware description language (VHDL) or Verilog, that configure connections between internal hardware modules with lesser functionality on a programmable device. Finally, it needs to be emphasized that the above mentioned technologies are often used in combination to achieve the result of a functional module.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) of embedding a block authentication code in a data stream for authentication purposes. However, one skilled in the art will recognize that embodiments of the invention could be used to embed other types of information in the data blocks such as hidden keys or messages. One of many ways that this could be accomplished is by using a specific hash function that results in a value that either directly or in combination with other data can result in one learning this other type of information.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A tangible non-transitory computer readable medium encoded with instructions for retinal image classification, executable by a machine under the control of a program of instructions, in which said machine includes a memory storing a program, wherein said execution of said instructions by one or more processors causes said "one or more processors" to perform the steps comprising:
   a. selecting a classifier and a figure of merit for quantifying classification quality;
   b. selecting a transform to generate features from input data;
   c. using a recursive process of functional dissipation to generate dissipative features from said features generated according to said transform;
   d. computing said figure of merit for all of said dissipative features generated;
   e. searching for at least one of said dissipative features that maximize said figure of merit on a training set; and
   f. classifying a test set with said classifier by using said at least one of said dissipative features.

2. A tangible non-transitory computer readable medium according to claim 1, wherein said functional dissipation comprises:
   a. selecting a number of iterations;
   b. setting a number of features;
   c. setting a multitude of subsets of said features;
   d. setting a recursive input to be an instance of said input data; and
   e. according to said number of iterations, iteratively,
      i. generating said features of said recursive input using said transform;
      ii. selecting largest features in one of said "subsets of said features" according to said "number of features";
      iii. generating modified features by applying a mask to modify said largest features;
      iv. setting said recursive input to be the inverse transform of modified features; and
      v. computing said dissipative features using statistics describing the probability distribution of said recursive input.

3. A tangible non-transitory computer readable medium according to claim 1, wherein said classifier is a nearest-neighbors classifier.

4. A tangible non-transitory computer readable medium according to claim 1, wherein said transform is set to be a discrete wavelet transform.

5. A tangible non-transitory computer readable medium according to claim 1, wherein said input data is high resolution, texture-rich data capable of being divided into said training set and said test set.

6. A tangible non-transitory computer readable medium according to claim 2, wherein said statistics are at least one statistical moment.

7. A tangible non-transitory computer readable medium according to claim 2, wherein said functional dissipation is repeated at least once for a multitude of said mask, said mask being randomly selected.

8. A tangible non-transitory computer readable medium according to claim 2, wherein said mask is a realization of a low variance Gaussian white noise convolved with low-pass filters.

9. A tangible non-transitory computer readable medium according to claim 2, wherein said "subsets of said features" are distinct levels of a discrete wavelet transform.

10. A retinal image classification system comprising an apparatus adapted to implement instructions residing on a tangible computer medium, and comprising:
   a. a classifier, said classifier configured for robustly classifying a multitude of input dissipative features;
   b. a figure of merit, said figure of merit configured for quantifying classification quality;
   c. a transform selector, said transform selector configured for selecting a transform to generate features from input data;
   d. a functional dissipative recursive processor, said functional dissipative recursive processor configured for generating said dissipative features from said features generated according to said transform;
   e. a figure of merit computational component, said figure of merit computational component configured for computing said figure of merit for all of said dissipative features generated;
   f. a dissipative features searcher, said dissipative features searcher configured for searching for at least one of said dissipative features that maximize said figure of merit on a training set; and
   g. a test set classifier, said test set classifier configured for classifying a test set with said classifier by using said at least one of said dissipative features.

11. A system according to claim 10, wherein said functional dissipative recursive processor comprises:
   a. an "iteration selector," said "iteration selector" configured for selecting a number of iterations;
   b. a "number of features setter," said "number of features setter" configured for setting a number of features;
   c. a "subset features setter" configured for setting a multitude of subsets of said features;
   d. a "recursive input setter," said "recursive input setter" configured for setting a recursive input to be an instance of said input data;
   e. a "features generator," said "features generator" configured for generating said features of said recursive input using said transform;
   f. a "largest features selector," said "largest features selector" configured for selecting said largest features in one of said "subsets of said features" that are computed by said transform according to said "number of features;"
   g. a "modified features generator," said "modified features generator" configured for generating modified features by applying a mask to modify said largest features;

h. a "recursive input - inverse transform setter," said "recursive input-inverse transform setter" configured for setting said recursive input to be the inverse transform of modified features; and i. a "dissipative features computational component," said "dissipative features computational component" configured for computing said dissipative features using statistics describing the probability distribution of said recursive input.

12. A system according to claim 10, wherein said classifier is a nearest-neighbors classifier.

13. A system according to claim 10, wherein said transform is set to be a discrete wavelet transform.

14. A system according to claim 10, wherein said input data is high resolution, texture-rich data capable of being divided into said training set and said test set.

15. A system according to claim 11, wherein said statistics are at least one statistical moment.

16. A system according to claim 11, wherein said functional dissipation is repeated at least once for a multitude of said mask, said mask being randomly selected.

17. A system according to claim 11, wherein said mask is a realization of a low variance Gaussian white noise convolved with low-pass filters.

18. A system according to claim 11, wherein said "subsets of said features" are distinct levels of a discrete wavelet transform.

19. A tangible computer readable medium according to claim 1, wherein said input data comprises at least one of:

a. biological data including at least one of:
  i. histological data;
  ii. cytological data;
  iii. dermatological data; and
  iv. retinal data;
b. computed tomography imaging data;
c. magnetic resonance imaging data;
d. time series biological data; and
e. non-biological data including at least one of:
  i. speaker recognition data;
  ii. remote sensing data; and
  iii. high frequency financial time series data.

20. A system according to claim 10, wherein said input data comprises at least one of:

a. biological data including at least one of:
  i. histological data;
  ii. cytological data;
  iii. dermatological data; and
  iv. retinal data;
b. computed tomography imaging data;
c. magnetic resonance imaging data;
d. time series biological data; and
e. non-biological data including at least one of:
  i. speaker recognition data;
  ii. remote sensing data; and
  iii. high frequency financial time series data.

* * * * *